(12) United States Patent
Kaiser

(10) Patent No.: US 6,975,596 B1
(45) Date of Patent: Dec. 13, 2005

(54) PROCESS, CONFIGURATION SERVER, SIGNALLING SERVER, COMPUTER PROGRAM, AND STORAGE MEDIUM FOR GENERATING SERVICE FUNCTION MODULES

(75) Inventor: Bernhard Kaiser, Vaihingen (DE)

(73) Assignee: Alcatel, Paris (FR)

( * ) Notice: Subject to any disclaimer, the term of this patent is extended or adjusted under 35 U.S.C. 154(b) by 958 days.

(21) Appl. No.: 09/708,642

(22) Filed: Nov. 9, 2000

(30) Foreign Application Priority Data

Nov. 13, 1999 (DE) ............................... 199 54 694

(51) Int. Cl.[7] ............................................ H04L 12/28
(52) U.S. Cl. ...................... 370/254; 370/352; 370/522
(58) Field of Search ............................... 370/352–356, 370/522, 254, 255, 229, 230, 410

(56) References Cited

U.S. PATENT DOCUMENTS

| 5,430,719 | A | * | 7/1995 | Weisser, Jr. ................. 370/389 |
| 5,544,303 | A | * | 8/1996 | Maroteaux et al. .......... 345/733 |
| 5,867,498 | A | * | 2/1999 | Gillman et al. .............. 370/385 |
| 5,875,242 | A | * | 2/1999 | Glaser et al. ........... 379/201.05 |
| 5,917,817 | A | * | 6/1999 | Dunn et al. .................. 370/352 |
| 6,002,941 | A | * | 12/1999 | Ablay et al. ................. 455/518 |
| 6,597,666 | B1 | * | 7/2003 | Hemzal et al. .............. 370/254 |
| 6,603,760 | B1 | * | 8/2003 | Smyk ........................... 370/352 |
| 6,647,111 | B1 | * | 11/2003 | Bjornberg et al. ...... 379/220.01 |
| 6,661,785 | B1 | * | 12/2003 | Zhang et al. ................ 370/352 |
| 6,667,969 | B1 | * | 12/2003 | Sevcik .......................... 370/352 |
| 6,721,284 | B1 | * | 4/2004 | Mottishaw et al. .......... 370/255 |
| 6,735,168 | B1 | * | 5/2004 | Schnell et al. ............... 370/217 |
| 6,735,175 | B1 | * | 5/2004 | Havens ........................ 370/236 |

OTHER PUBLICATIONS

Travis Russell, "Signaling System #7," 1998, McGraw-Hill, 2nd Edition, pp. 20-23.*
ITU-T Recommendation H.323, Feb. 1998.
ITU-T Recommendation Q. 1211, Mar. 1993.

* cited by examiner

*Primary Examiner*—Ricky Ngo
*Assistant Examiner*—Nittaya Juntima
(74) *Attorney, Agent, or Firm*—Sughrue Mion, PLLC

(57) ABSTRACT

A process for generating service function modules for a signalling server which can provide signalling functions for the control of communications connections, including the steps of: making available procedure modules for detecting, processing and forming signalling messages by a configuration server, displaying the procedure modules in the form of symbols by a user interface on the configuration server, detecting a selection and arrangement, predetermined by a user, of the symbols of the procedure modules at the user interface, combining the procedure modules to form a service function module in a manner predetermined by the selection and arrangement of the relevant symbols of the procedure modules at the user interface, and making available the service function module by the configuration server for the signalling server. A configuration server, a signalling server, a computer program and a storage medium therefore are also disclosed.

14 Claims, 3 Drawing Sheets

PROCESS, CONFIGURATION SERVER, SIGNALLING SERVER, COMPUTER PROGRAM, AND STORAGE MEDIUM FOR GENERATING SERVICE FUNCTION MODULES

BACKGROUND OF THE INVENTION

The present invention relates to a process for generating service function modules for a signalling server which can provide signalling functions for the control of communications via a communications network, particularly of multimedia communications via a packet switching data network, and to a configuration server for generating service function modules for a signalling server which can provide signalling functions for the control of communications via a communications network, particularly of multimedia communications via a packet switching data network, a signalling server or generating service function modules with which the signalling server can provide signalling functions for the control of communications via a communications network, particularly of multimedia communications via a packet switching data network, a computer program for generating service function modules with which a signalling server can provide signalling functions for the control of communications via a communications network, particularly of multimedia communications via a packet switching data network, and a storage medium for generating service function modules with which a signalling server can provide signalling functions for the control of communications via a communications network, particularly of multimedia communications via a packet switching data network.

The invention is based on the provision of telecommunications service functions in a packet switching data network, particularly in the Internet, wherein multimedia communications connections between end subscribers are established via the packet switching data network. In simple cases, pure voice calls or pure video calls are understood by the term "multimedia communications connections", whereas in more complicated cases the term also means combinations of voice and video as well as possibly additional data, e.g. computer files etc. Pure voice calls via the Internet are also referred to as Voice over Internet Protocol (VoIP) calls.

ITU-T Recommendation H.323, issue 2/98, defines a possible infrastructure for audiovisual and multimedia connections via packet-oriented networks, referred to in the following only as multimedia connections. Such an infrastructure is also required i.a. for Voice over Internet Protocol connections. Alternatives to an infrastructure according to ITU-T Recommendation H.323 are discussed for example within the IETF (Internet Engineering Task Force). The individual components of an infrastructure for establishing audiovisual and multimedia connections are, in the terminology of ITU-T Recommendation H.323: terminals, gateways and gatekeepers, also known as call servers.

Terminals provide access to a packet switching data network and comprise, as a core component, a voice codec with which voice signals are coded into digital data packets and digital data packets are decoded into voice signals. Further codecs, for example video codecs for video signals, can likewise be contained in a terminal.

If a first terminal knows the Internet address of a second terminal, the first terminal can directly establish a multimedia connection to this terminal with the aid of this Internet address. Normally, however, Internet addresses for terminals are not permanently assigned but are re-allocated in each Internet session, so that further components are used to establish a multimedia connection. These are the so-called gatekeepers for establishing and maintaining connections within a packet switching data network, and the so-called gateways for connections to circuit-switched telecommunications networks. The gateways provide an interface function between a packet switching data network and a circuit-switched telecommunications network, for example an ISDN (Integrated Services Digital Network). On the side of the circuit-switched telecommunications network, the gateway communicates for example using the CCITT Signalling System No. 7, while on the side of the packet switching data network it communicates using signalling according to ITU-T Recommendation H.225, which for example describes the establishment and clearance of a connection within a packet switching data network. Additionally, a gateway converts different audio, video and data formats in the respective networks where this is necessary.

Within a packet switching data network, gatekeepers make services for connection establishment and clearance and for connection control available to the connected terminals. As already mentioned, on the one hand terminals can communicate with one another directly without a gatekeeper. On the other hand, terminals advantageously can be supported by a gatekeeper, for example during connection establishment, in which case for example a terminal makes a request to the gatekeeper for a connection to a communications partner terminal. Then the gatekeeper determines the required address of the communications partner terminal and, using the signalling normally employed in the packet switching data network, e.g. signalling according to ITU-T Recommendation H.225 completes the desired connection to the communications partner terminal.

A gatekeeper or gateway can also provide further functions, e.g. service functions similar to the service-switching functions or service-control functions within a so-called Intelligent Network (IN=Intelligent Network, see for example ITU-T Recommendation Q.1215) based on a circuit-switched telecommunications network. A typical example of such service functions of an Intelligent Network is the so-called Call Completion on Busy Subscriber (=CCBS) service. This service can be activated when a called subscriber is busy. If the service is activated by the calling subscriber, a service logic in the called subscriber's exchange sends the calling subscriber's exchange a service signalling message when the called subscriber is no longer busy.

Service functions based on signalling messages can be made available not only in a circuit-switched telecommunications network, but also for a packet switching data network. For this purpose, in a first configuration, service provision devices of a circuit-switched telecommunications network can be addressed from the packet switching data network. However, in a further configuration, such services are provided directly by servers of a packet switching data network, e.g. by gateways or gatekeepers. The creation of the service logics required for this purpose, i.e. the procedures for transmitting and receiving service signalling messages in the respective servers, is however complicated and error-prone, as the procedures must first be coded in a programming language and then be compiled to form machine instructions executable by the servers.

Although, as already stated in the introduction, the present invention is based on problems relating to a packet switching data network, and in particular relating to the Internet, it is not limited thereto. The described problems are however of lesser significance in conventional communications networks as solutions are already available therein in the form of the Intelligent Network. However, due to the different type of signalling, these solutions can only be conditionally applied to packet switching data networks. The solution presented in the following, which was sought specifically for the Internet, can however also be applied to other, conventional communications networks.

SUMMARY OF THE INVENTION

The object of the invention is therefore to provide a process and devices with which service function modules can be reliably and easily created for the provision of service functions for a communications network.

This object is attained by a process for generating service function modules for a signalling server which can provide signalling functions for the control of communications via a communications network, particularly of multimedia communications via a packet switching data network, for making available procedure modules for capturing, processing, and forming signalling messages of a communications network by means of a configuration server; for displaying the procedure modules in the form of symbols via a user interface on the configuration server; for capturing a user-defined selection and arrangement of the symbols of the procedure modules on the user interface, for combining the procedure modules by means of the configuration server to form a service function module in a manner defined by the selection and arrangement of the respective symbols of the procedure modules on the user interface; and making available the service function module by the configuration server for the signalling server.

This object is further attained by a configuration server for generating service function modules for a signalling server which can provide signalling functions for the control of communications via a communications network, particularly of multimedia communications via a packet switching data network, wherein the configuration server comprises first provision means designed to enable the configuration server to make available procedure modules for capturing, processing, and forming signalling messages of a communications network, wherein the configuration server comprises a user interface designed to enable the configuration server to display the procedure modules in the form of symbols, wherein the configuration server comprises capture means designed to enable the configuration server to capture a user-defined selection and arrangement of the symbols of the procedure modules on the user interface, wherein the configuration server comprises combining means designed to enable the configuration server to combine the procedure modules into a service function module in a manner defined by the selection and arrangement of the respective symbols of the procedure modules on the user interface, and wherein the configuration server comprises second provision means designed to enable the configuration server to make available the service function module for the signalling server.

The object is further attained by a signalling server for generating service function modules with which the signalling server can provide signalling functions for the control of communications via a communications network, particularly of multimedia communications via a packet switching data network, wherein the signalling server comprises first provision means designed to enable the signalling server to make available procedure modules for capturing, processing, and forming signalling messages of a communications network, wherein the signalling server comprises a user interface designed to enable the signalling server to display the procedure modules in the form of symbols, wherein the signalling server comprises capture means designed to enable the signalling server to capture a user-defined selection and arrangement of the symbols of the procedure modules on the user interface, wherein the signalling server comprises combining means designed to enable the signalling server to combine the procedure modules into a service function module in a manner defined by the selection and arrangement of the respective symbols of the procedure modules on the user interface, and wherein the configuration server comprises second provision means designed to enable the signalling server to make the service function module available for execution.

This object is further attained by a computer program for generating service function modules with which a signalling server can provide signalling functions for the control of communications via a communications network, particularly of multimedia communications via a packet switching data network, wherein the computer program contains a code with which the steps of the process for generating service function modules described above, can be executed when the computer program is run on a computer.

This object is further attained by a storage medium for generating service function modules with which a signalling server can provide signalling functions for the control of communications via a communications network, particularly of multimedia communications via a packet switching data network, wherein the storage medium can be read by a computer and contains a computer program code with which the steps of the process for generating service function modules described above, can be executed when the computer program is run on a computer.

The idea underlying the invention is that procedure modules pre-produced on a configuration server are made available in the form of program code sequences executable by a signalling server and suitable for the transmission, processing or reception of service-signalling messages by the signalling server for the control of multimedia communications connections via a packet switching data network. The signalling server can for example be one of the gateways or gatekeepers, also known as call servers, referred to in the introduction. The service-signalling messages serve to provide services for the terminals mentioned in the introduction. The configuration server can be a separate computer system or can be integrated in the signalling server. The procedure modules are displayed in the form of symbols, also known as icons, at a graphic user interface of the configuration server and thus can be easily manipulated by a user, e.g. by means of a computer mouse. The user can select symbols and arrange them in a manner corresponding to a flow sequence, requested by the user, of a service logical function to be created. Here flow sequence is to be understood in particular as the transmission and reception of predetermined service-signalling messages in a sequence corresponding to the service logical function. The configuration server then detects the symbols at the user interface which have been selected and arranged by the user and, in accordance with this arrangement, from the procedure modules in each case assigned to the selected symbols, assembles a service function module which the configuration server then makes available for loading into the signalling server. Following the loading of the service function module, the signalling server can then provide the service defined by the user, and in particular can transmit and receive service-signalling messages in the manner thus defined and thereby provide a service configured by the user.

In an advantageous further development of the invention, the configuration server also generates an interface module which can detect parameter data for the service function module. Such an interface module is for example loaded into a network management server and enables the service configured in accordance with the invention to be adapted for example to local, customer-specific- or time conditions or simply to be activated or deactivated. The interface module can also run directly on the signalling server or on a personal computer connectible to the signalling server. In addition to the structure of a packet switching data network according to ITU-T Recommendation H.323 explained in the introduction and the signalling normally used therein, the invention can also be applied to signalling in accordance with signalling protocols SIP and MGCP (SIP= Session Initiation Protocol, MGCP=Media Gateway Control Protocol) discussed within the IETF (Internet Engineering Task Force) and the infrastructures on which they are in each case based. It is readily possible to apply the invention to further signalling protocols or packet switching data network structures yet to be developed.

Further developments of the invention are disclosed in the sub-claims and the following description.

In the following the invention will be further explained with reference to the attached drawings in which.

Figure 1:
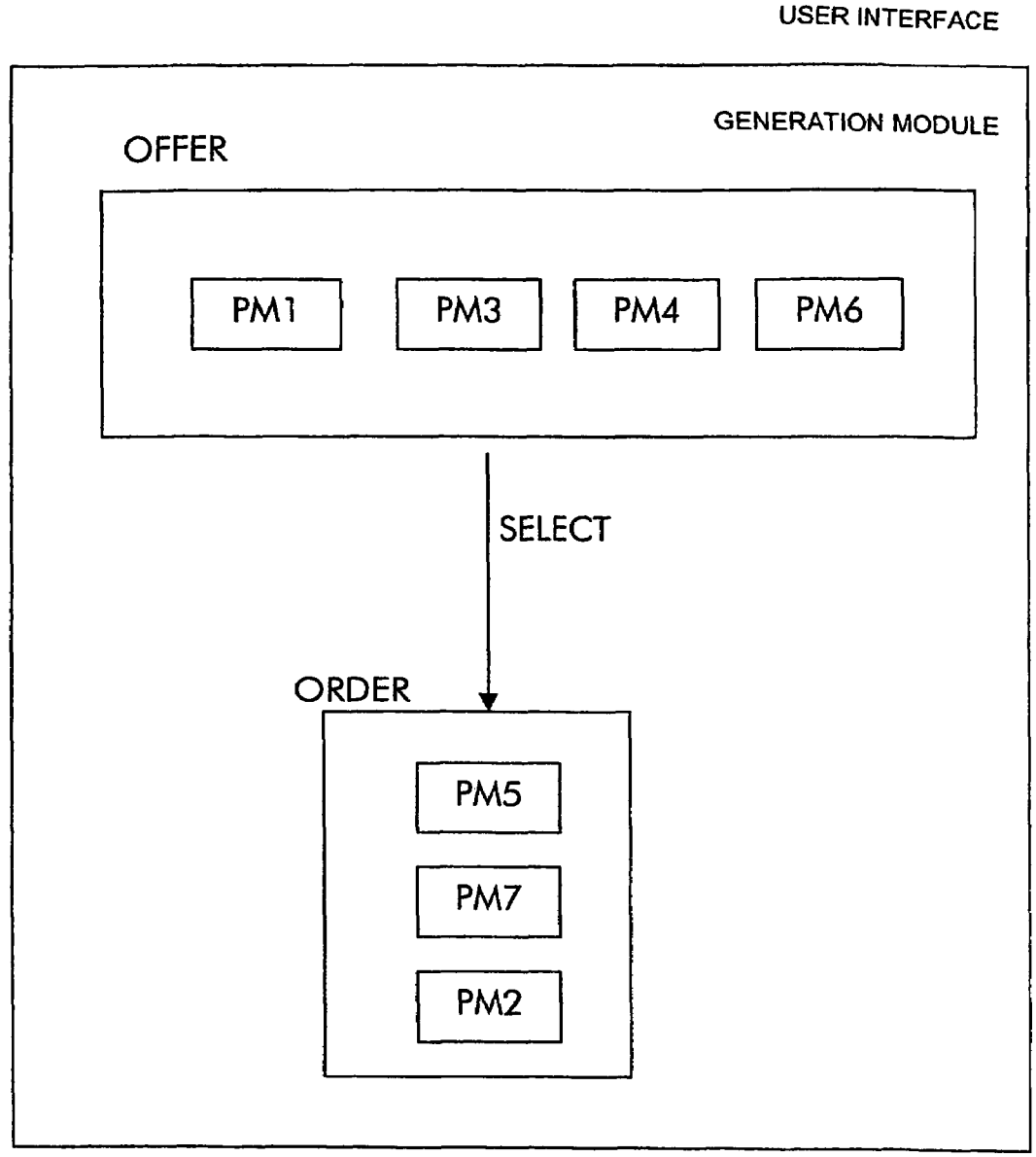
FIG. 1 illustrates a highly schematized arrangement for the implementation of the invention.

FIG. 1 illustrates a highly schematized arrangement for the implementation of the invention. The procedure modules PM1, PM2, PM3, PM4, PM5, PM6 and PM7 are shown in the form of symbols, also known as icons, at a graphic user interface UI run on a configuration server SER according to the invention which will be explained in detail with reference to FIG. 2. Each of these symbols thus represents a procedure module for the detection, processing and formation of signalling messages of a packet switching data network by a signalling server. FIG. 1 also illustrates two fields OFFER and ORDER between which the procedure modules are distributed. The procedure modules PM1, PM3, PM54 and PM6 are shown in the field OFFER. These procedure modules are offered for selection by the configuration server SER at the graphic user interface UI and can be manipulated by a user, for example by means of a computer mouse, through a so-called drag and drop operation illustrated in FIG. 1 by an arrow SELECT. The user can thus "pull" symbols of procedure modules from the field OFFER into the field ORDER and arrange them therein the desired manner. The procedure modules PM5, PM7 and PM2 have been selected and arranged by a user in this way. The configuration server SER then detects this arrangement of symbols and assembles the associated procedure modules in accordance therewith, i.e. combines them to form a service function module whose individual components interact as shown in the field ORDER. In the service function module created as shown in FIG. 1, the procedure module PM5 detects a service-signalling message for example. The procedure module PM7 then processes the contents of the service-signalling message by entering these contents into a database and reading a correlated content from the database. Finally the procedure module PM2 forms a further service-signalling message from the content read from the database.

Naturally the possibility can be provided that, in a drag and drop operation, only a copy of the procedure module is pulled into the field ORDER while at the same time a further copy is left in the field OFFER.

This graphic user interface UI is based on a computer program with which, in accordance with the invention, a service function module can be generated, which is referred to here as generation module TL and is to be considered as a computer program according to the invention.

Figure 2:
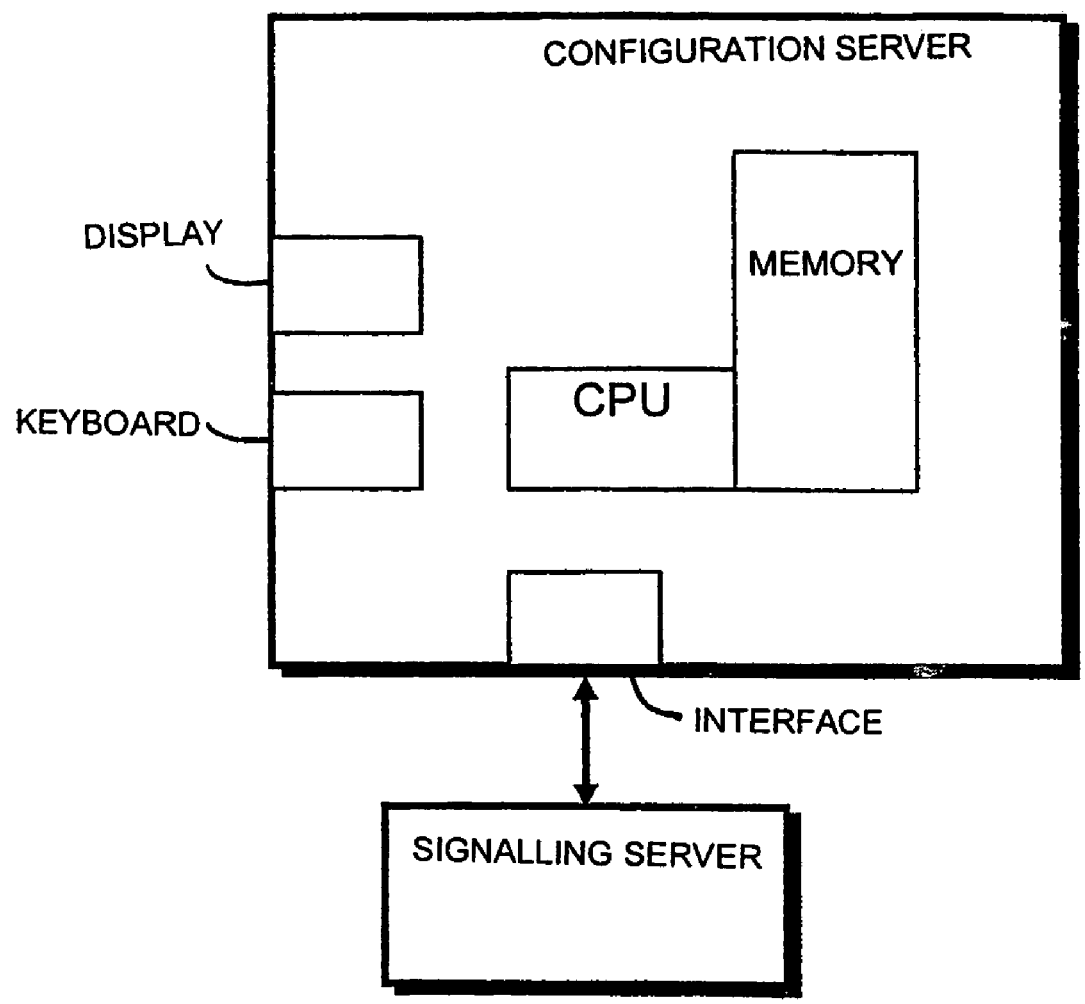
FIG. 2 illustrates a configuration server (SER) according to the invention for the implementation of the process according to the invention. The configuration server also comprises a storage medium according to the invention in which a computer program according to the invention is stored.

A computer for the execution of this generation module TL is illustrated in FIG. 2 in respect of some of its main components as configuration server SER. The configuration server SER can for example be part of a network management system or a separate computer which can load a service function module, which it has generated, into a call server. The configuration server SER contains a control means CPU, e.g. a processor, for the execution of machine-readable commands, for example and here in particular for the execution of the generation module TL. The configuration server SER also comprises a memory MEM in which the generation module TL can be stored. The configuration server SER also comprises, as input means, a keyboard KEY and a computer mouse (not shown separately) for sending data to the generation module TL during the execution thereof and, as output means, a display device DIS for example for outputting data which have been generated by the generation module TL during the execution thereof. The configuration server SER also comprises an interface device IF via which the configuration server SER can make a service function module available to a signalling server SSER. The components of the server SER are linked to one another by interconnections not shown in FIG. 2. An operating system, e.g. UNIX or DOS (disc operating system), manages the operating means of the server SER and controls i.a. the execution of the generation module TL.

A signalling server according to the invention differs from a configuration server according to the invention in that in a signalling server according to the invention the functions of a conventional signalling server are combined with those of a configuration server according to the invention.

Following the generation of a new service function module, this is made available in the configuration server, whereupon it can be used by a signalling server separate from the configuration server or combined therewith. For this purpose the generated service function module must of course be loaded into the signalling server or, if the signalling server is at the same time a configuration server, activated therein. However this is not based on a principle specific to the invention.

A service to be provided and therefore to be made available by the configuration server through the generation of a service function module must, as stated, generally be able to be adapted to local, customer-specific or time conditions or simply activated or deactivated. For this purpose, different parameters must then be preset by the network management. For this event, in a further development of the invention it is provided that in association with the generation of a service function module, an interface module is also generated, by means of which the service function module can then be configured. Having been loaded into a network management server, this interface module then has the task of firstly requesting an operator to input the parameters required for the newly generated service. Then this interface module has the task of sending these parameters to the signalling server(s) by which the service is then to be provided.

Features yet to be defined for particular situations include the specification of the relevant protocols to be used. Apart from the possible provision of a multilingual facility or self-adaptation facility, on the one hand fixed settings and on the other hand entirely free variability via the inputting of parameters are conceivable.

Even in the event of fixed settings, different protocols can be used for signalling messages to be transmitted and received.

For example, a first procedure module contained in the service function module can be provided for cooperation with the public network, and for this purpose for the use of signalling messages according to ITU-T-Recommendation H.323, while another procedure module can be provided for cooperation with the Internet, and for this purpose for the use of SIP signalling messages or MGCP signalling messages.

Both for an interface module to be generated together with a service function module and for the variations possibly differing in respect of protocols, it is initially conceivable for further procedure modules to be made available for this purpose from the start and for these then to be offered by means of different symbols at the user interface in the OFFER area.

In general however, a quite specific set of parameters will be used for a specific procedure module, this parameter set being independent of precisely how this procedure module is combined with other procedures to form a service function module. Then each "service function module—procedure module" can be assigned an "interface module—procedure module", whereupon the two mutually assigned procedure modules are combined under a common symbol at the user interface UI. The compilation of the "interface module—procedure modules" to form an interface module then can also take place in association with the compilation of the "service function module—procedure modules" to form a service function module. It is immaterial to what extent this then takes place automatically or upon command (e.g. by means of a button on the user interface UI).

Basically it is also conceivable for the different procedure modules to be further adapted in respect of the service to be newly created. For this purpose it is conceivable to provide further input options, for example after a double click on the associated symbol.

It is also effective for a configuration server according to the invention to provide the option of creating new procedure modules or of changing existing procedure modules in order to be able to offer both new services and cooperation with new types of network components. However, an editor required for this purpose basically is not novel.

Finally the use of a configuration server according to the invention is to be briefly described with reference to FIG. 3. As already mentioned in the foregoing, the present invention was developed for use in the Internet. However in the following it will be described for use in an Intelligent Network for the additional explanation of this possibility. However, it will be quite clear that an Internet signalling server could be provided in place of the Intelligent Network service control point SCP. The service functions to be provided here are referred to as functions of the Intelligent Network. It will also be quite clear that when an Internet signalling server is provided in place of the Intelligent Network service control point SCP, this can be used both directly to configure services for the Internet and via gateways to address a service control point SCP of the Intelligent Network for the configuration of services therein.

Figure 3:
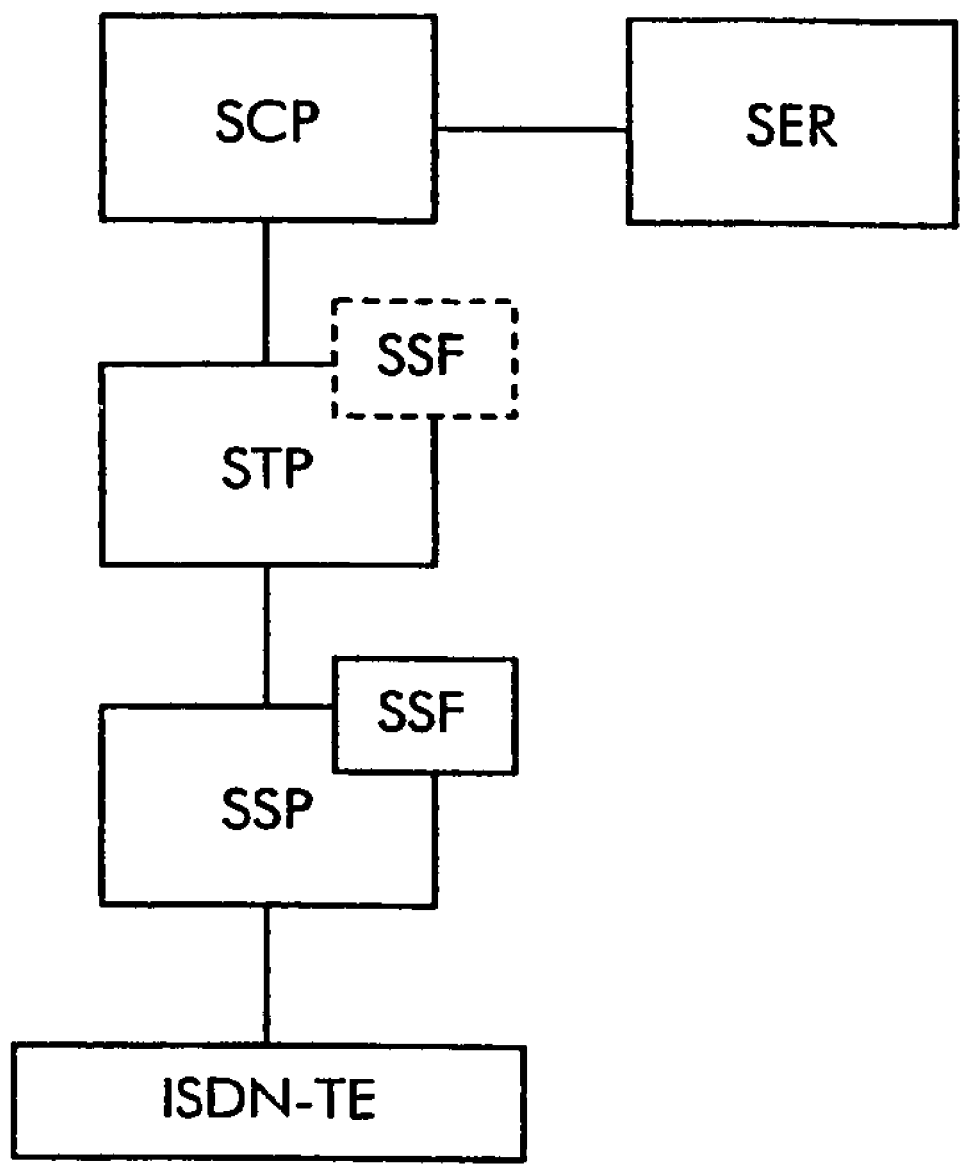
FIG. 3 illustrates the use of a-configuration server according to the invention in an Intelligent Network.

FIG. 3 illustrates, one above another, a subscriber terminal ISDN-TE, an exchange SSP, a signalling network node STP, and a service control point SCP. These are also interconnected in this sequence. In addition to the service control point SCP, which in the present description is also referred to as signalling server, a configuration server SER according to the invention has also been shown. Service control point SCP and configuration server SER can also be combined as signalling server according to the invention.

The exchange SSP and the signalling network node STP here are also assigned interface units with a service switching function SSF.

The subscriber terminal ISDN-TE has been specified here by way of example as a subscriber device corresponding to the ISDN standard. In principle any subscriber terminal, whether analogue or digital, whether for voice or for data or for both, can trigger functions of the Intelligent Network.

The exchange SSP has been specified here as an exchange which can detect a service request of the Intelligent Network, i.e. as so-called service switching point SSP. Subscriber terminals not directly connected to an exchange in the form of a SSP must firstly be switched to such an exchange by normal means.

The service switching function SSF integrated in the exchange SSP detects IN calls and forwards the enquiries to the SCP. The requesting of an IN function is coupled to predefined triggers. Apart from specific subscriber numbers which represent a trigger point, specific connection states, such as busy subscriber, or in some situations even the lifting of the handset, are interpreted for example as trigger point. The further actions can then be evaluated by the IN.

The signalling network node STP is simultaneously the service transfer point STP of the Intelligent Network and so-called signalling transfer point STP of the known signalling network SS7. At least in the latter form, it is generally known; in the signalling network it assumes the function of an exchange and a concentrator.

Signalling procedure No. 7 (SS7) is used between SSP and SCP, the ISUP protocol (ISUP=ISDN User Part) based on SS7 being used between SSP and STP, and the INAP protocol (INAP= Intelligent Network Application Part) likewise based on SS7 being used between STP and SCP.

The service control point SCP controls the enquiries of the SSPs, and thus ultimately the IN functions, in real time. Such service control points SCP are generally known and as such not covered by the present invention. The fact that such SCPs fulfil the tasks requested of them in cooperation not only with the STPs, the SSPs and the subscriber terminals but also in cooperation with configuration databases SMP (SMP=Service Management Point) or even with other network elements, is likewise known and forms part of the present invention only in that the invention also describes such further network elements.

Also with regard to the interface units with a service switching function SSF, it has been assumed that these are generally known or at least will be readily understood by the skilled person. The interface unit SSF linked to the SSP operates in relation to the useful-signal gateway device TG in the same way as the SSP itself operates in relation to a connected exchange without the function of a SSP. The interface unit SSF linked to the STP operates in relation to the signalling gateway device SG in the same way as the STP itself operates in relation to a further SSP.

The service control point SCP, which in the present description is also referred to as signalling server, is assigned a configuration server SER according to the invention. As already stated, service control point SCP and configuration server SER can also be combined as a signalling server according to the invention.

Precisely in the last mentioned example, in which the configuration server according to the invention is used not in association with a packet switching data network but directly in an Intelligent Network, it should be noted that the described structures often overlap in practice. Thus in practice the SSP or the STP also often performs the functions of the SCP. Therefore in such a case the configuration server according to the invention is to be connected not to the SCP but to the SSP or the STP. It is exactly in such a case that the advantage of a configuration server according to the invention when used in a conventional communications network also manifests itself. Although the structure shown in FIG. 3 is not physically present here, it is however still present as a logical structure.

By means of this configuration server according to the invention, new services to be provided by the service control point SCP can be configured and introduced into the service control point very easily in this way.

What is claimed is:

1. A process for generating service function modules for a signalling server which can provide signalling functions for control of communications via a communications network, wherein the process comprises:
    making available procedure modules for capturing, processing, and forming signalling messages of a communications network by means of a configuration server;
    displaying the procedure modules as symbols via a user interface on the configuration server;
    capturing a user-defined selection and arrangement of the symbols of the procedure modules on the user interface,
    combining the procedure modules by means of the configuration server into a service function module in a manner defined by the selection and arrangement of the respective symbols of the procedure modules on the user interface, wherein the captured arrangement of the symbols dictates a flow sequence of the procedure modules in the service function module; and
    making available the service function module by the configuration server for the signalling server, wherein the service function module transmits and receives signalling messages according to at least one of ITU-T Recommendation H.323, Session Initiation Protocol and Media Gateway Control Protocol.

2. The process according to claim 1, wherein the service function module is loaded into the signalling server.

3. The process according to claim 1, wherein an interface module for inputting parameter data for the service function module is generated by the configuration server.

4. The process according to claim 3, wherein the interface module for inputting parameter data for the service function module is loaded into a network management server.

5. A storage medium for generating service function modules with which a signalling server can provide signalling functions for control of communications via a communications network, wherein the storage medium can be read by a computer and contains a computer program code with which the steps of the process according to claim 1 can be executed when the computer program code is run on a computer.

6. A configuration server for generating service function modules for a signalling server which can provide signalling functions for control of communications via a communications network, the configuration server comprising:
    first provision means that enable the configuration server to make available procedure modules for capturing, processing, and forming signalling messages of a communications network,
    a user interface that enables the configuration server to display the procedure modules as symbols,
    capture means that enable the configuration server to capture a user-defined selection and arrangement of the symbols of the procedure modules on the user interface, wherein the arrangement of the symbols dictates a flow sequence of the procedure modules,
    combining means that enable the configuration server to combine the procedure modules into a service function module in a manner defined by the selection and arrangement of the respective symbols of the procedure modules on the user interface, wherein the arrangement of the symbols dictates a flow sequence of the procedure modules in the service function module, and
    second provision means that enable the configuration server to make available the service function module for the signalling server, wherein the service function module transmits and receives signalling messages according to at least one of ITU-T Recommendation H.323, Session Initiation Protocol and Media Gateway Control Protocol.

7. A signalling server for generating service function modules with which the signalling server can provide signalling functions for control of communications via a communications network, the signalling server comprising:
    first provision means that enable the signalling server to make available procedure modules for capturing, processing, and forming signalling messages of a communications network,
    a user interface that enables the signalling server to display the procedure modules as symbols,
    capture means that enable the signalling server to capture a user-defined selection and arrangement of the symbols of the procedure modules on the user interface,
    combining means that enable the signalling server to combine the procedure modules into a service function module in a manner defined by the selection and arrangement of the respective symbols of the procedure modules on the user interface, wherein the arrangement of the symbols dictates a flow sequence of the procedure modules in the service function module, and
    second provision means that enable the signalling server to make the service function module available for execution, wherein the service function module transmits and receives signalling messages according to at least one of ITU-T Recommendation H.323, Session Initiation Protocol and Media Gateway Control Protocol.

8. A computer program for generating service function modules with which a signalling server can provide signalling functions for control of communications via a communications network, wherein the computer program contains a code with which the steps of the process according to claim 1 can be executed when the computer program is run on a computer.

9. A process for generating service function modules for a signalling server that provides signalling functions for control of communications via a communications network, wherein the process comprises:
    making available procedure modules for capturing, processing, and forming signalling messages of a communications network by means of a configuration server;

displaying the procedure modules as symbols via a user interface on the configuration server;

capturing a user-defined selection and arrangement of the symbols of the procedure modules on the user interface, combining the procedure modules by means of the configuration server into a service function module in a manner defined by the selection and arrangement of the respective symbols of the procedure modules on the user interface; and making available the service function module by the configuration server for the signalling server, wherein the service function module is executed in the signalling server and that the service function module transmits and receives signalling messages according to at least one of ITU-T Recommendation H.323, Session Initiation Protocol and Media Gateway Control Protocol.

10. The process according to claim 9, wherein the service function module is loaded into the signalling server.

11. The process according to claim 9, wherein an interface module for inputting parameter data for the service function module is generated by the configuration server.

12. The process according to claim 11, wherein the interface module for inputting parameter data for the service function module is loaded into a network management server.

13. A computer program for generating service function modules with which a signalling server can provide signalling functions for the control of communications via a communications network, wherein the computer program contains a code with which the steps of the process according to claim 9 can be executed when the computer program is run on a computer.

14. A storage medium for generating service function modules with which a signalling server can provide signalling functions for the control of communications via a communications network, wherein the storage medium can be read by a computer and contains a computer program code with which the steps of the process according to claim 9 can be executed when the computer program is run on a computer.

* * * * *